July 15, 1924.  
P. J. NICHOLAS ET AL  
1,501,882  
ANIMAL TRAP  
Filed May 29, 1923
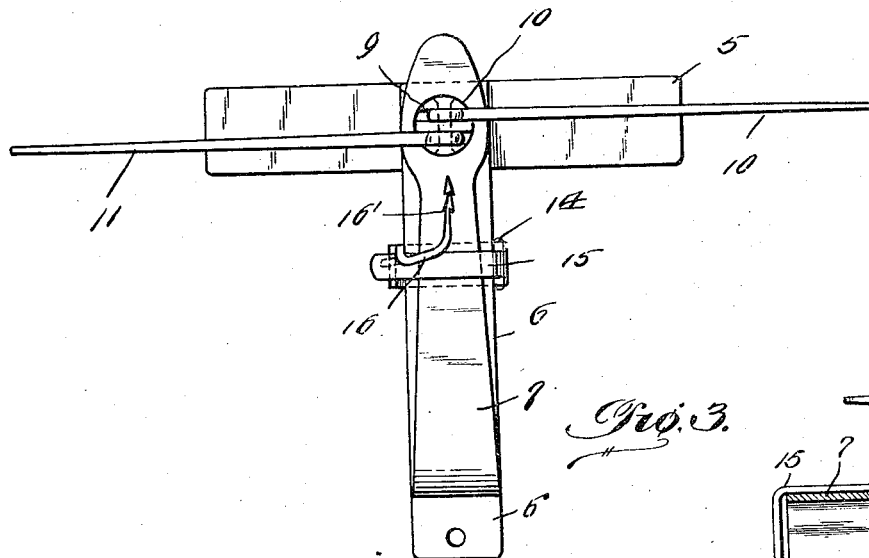
Fig. 1.
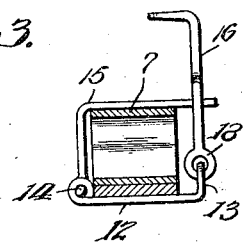
Fig. 3.
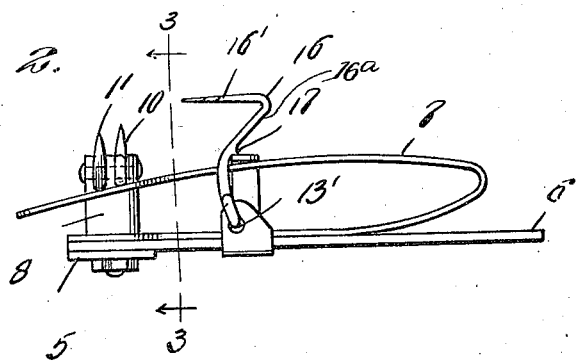
Fig. 2.
P. J. Nicholas,  
Walter Jones,  
Inventors
Witnesses:  
F. L. Fox  
E. L. Stomelle
Clarence O'Brien  
Attorney Patented July 15, 1924.

1,501,882

UNITED STATES PATENT OFFICE.

PETER J. NICHOLAS AND WALTER JONES, OF DOVER, MAINE.

ANIMAL TRAP.

Application filed May 29, 1923. Serial No. 642,357.

*To all whom it may concern:*

Be it known that we, PETER J. NICHOLAS and WALTER JONES, citizens of the United States, residing at Dover, in the county of Piscataquis and State of Maine, have invented certain new and useful Improvements in Animal Traps, of which the following is a specification.

Our invention relates to improvements in animal traps, and the primary object thereof resides in the provision of such a device that is comparatively simple of construction, extremely inexpensive of manufacture, the same being further characterized by the easy manner in which the trap may be set and baited.

The nature and advantages of the invention will be better understood when the following detailed description is read in connection with the accompanying drawings, the invention residing in the construction, combination, and arrangement of parts as claimed.

In the drawings forming part of this application, like numerals of reference indicate similar parts in the several views, and wherein:

Figure 1 is a top plan view of a trap constructed in accordance with this invention, the same being shown in a set position.

Figure 2 is a side elevational view of a trap shown in Figure 1.

Figure 3 is a transverse cross sectional view of a portion of the trap for more clearly showing the means for retaining the jaws in a set position.

With particular reference to the drawings, our trap includes the provision of a T shaped base having a front cross plate 5, and a rearwardly extending plate 6 connected at its front end to the central portion of said first mentioned plate 5. Secured upon the said T base of the trap is the front end of the lower portion of the usual expansion spring 7, this spring extending parallel with the plate 6 of said base.

Adjacent the front end of the upper portion of this spring 7 is an opening 8 for permitting the same to engage over a vertical spacing block 8' upon the front end of said base, and in alinement with said spring 7. The upper end of this spacing block 8' is formed with a pair of transverse slots 9, in which are positioned the inner ringed ends 10 of jaws 11, the same being pivotally secured within these slots by a pivot pin 12. The jaws 11 are each in the form of a rod having their outer ends curved upwardly, and pointed as in Figure 3.

It will of course be understood that by depressing the spring 7 and engaging the upper portion thereof over the spacing block 8' that the jaws 11 may be extended into a position shown in Figures 1, 2 and 3, and as a means for retaining the said spring in its depressed position, there is secured to the under surface of the plate member 6 of the T base, a cross plate 12. Both ends of this plate extend outwardly of the sides of the member 6 and one end thereof is bent upwardly as at 13, while the other end has pivoted thereto as at 14, a swinging latch member 15. This latch member 15 extends forwardly and thence upwardly, and is adapted to be engaged over the upper portion of said spring 7 and to be retained in such a position by a bait carrying member 16 having a shoulder or lug 17 formed thereon for engaging over the adjacent edge of the latch member 15 and a rearwardly inclined portion 16$^a$ adapted to be engaged by the latch member 15 for pushing the bait carrying portion 16' forwardly into the animal's mouth.

This bait carrying member 16 is formed with an eye 18 upon its lower end for engagement with an opening 13' in said upwardly bent end of the cross plate 12.

The bait carrying member 16 includes a forwardly bent portion 16' for receiving the bait thereon, and in view of the above description, it is believed by us, that the advantages and operation of a trap constructed in accordance with this invention will be readily understood by those skilled in the art, and while we have herein shown and described the preferred embodiment of the present invention, it is nevertheless to be understood that minor changes may be made therein, without departing from the invention as claimed. When the animal bites the bait carried by the holder at 16', the same will be moved forwardly to disengage the projection 17 from the plate 15 for releasing the same, which, under the action of the spring will be forced upwardly about its pivot and will engage the inclined portion 16$^a$ of the bait holder for forcing this bait holder forward into the mouth of the animal and exerting a temporary holding action of the animal at the top, in order to give the spring time to operate the jaws 10 and 11 for imprisoning the animal in the trap.

Having thus described our invention, what we claim as new, and desire to secure by Letters Patent is:—

An animal trap, including a T-shaped base, a pair of jaws pivotally secured thereto and spaced therefrom, an expansion spring secured at one end to said base and at right angles to the jaws at the pivoted ends thereof, said spring having an opening adjacent its opposite ends for permitting the same to engage over said jaws, a plate secured to said base, a latch member hingedly mounted upon one end of said plate and adapted for engaging over said spring when the same is in a contracted position, and a bait carrying member pivoted to the opposite ends of said plate having a rearwardly and upwardly extending portion terminating in a forwardly extending prong for receiving bait, and having a projection on the rear side of the upwardly extending portion for engaging and retaining said latch in position upon said spring, whereby the spring will act equally on both of said jaws for moving them on their pivots by reason of its mounting perpendicular to the open position of the jaws, and will be released in a slight forward movement of the bait carrying member so that the plate will engage the rearwardly and upwardly extending portion for forcing said forwardly extending prong into the mouth of the animal to exert a temporary holding action of the animal in the trap during the closing of the jaw members.

In testimony whereof, we affix our signatures.

PETER J. NICHOLAS.
WALTER JONES.